Oct. 1, 1968  G. H. V. DELEPIERE ET AL  3,403,660

DEVICE FOR PROCESSING ARTICLES OF NON-MAGNETIC MATERIAL

Filed May 25, 1967  2 Sheets-Sheet 1

Inventors
Guy H. V. Delepiere
Paul P. Blavier

Stevens, Davis, Miller & Mosher
Attorneys

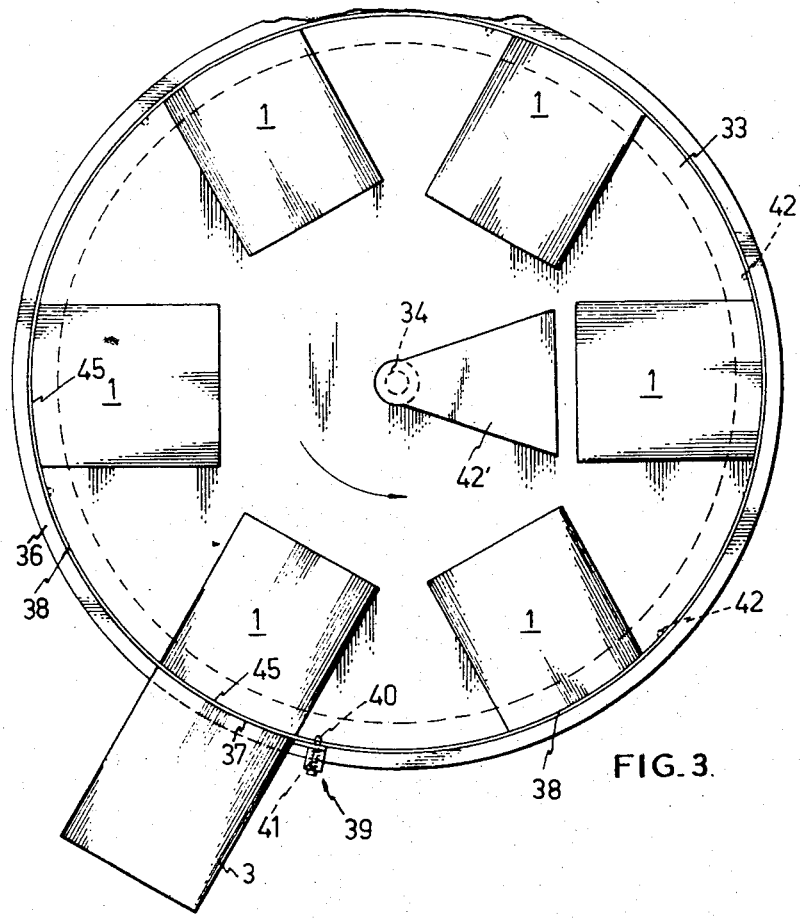
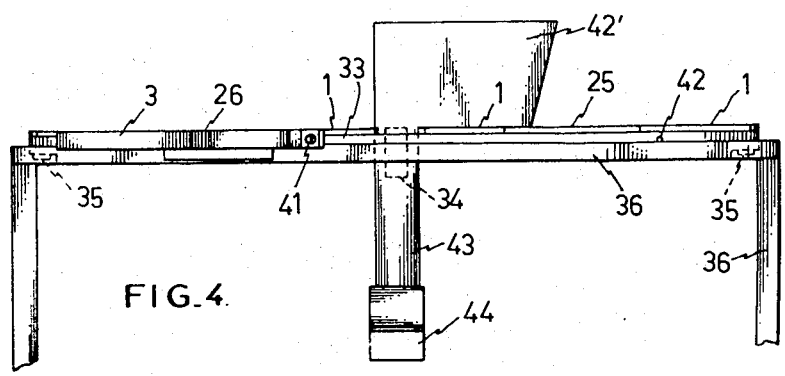

United States Patent Office 3,403,660
Patented Oct. 1, 1968

3,403,660
DEVICE FOR PROCESSING ARTICLES OF
NON-MAGNETIC MATERIAL
Guy H. V. Delepiere, 28 Chaussee de Boitsfort, Ixelles, Belgium, and Paul P. Blavier, 142 Rue Bemel, Woluwe-St. Pierre, Belgium
Filed May 25, 1967, Ser. No. 641,375
Claims priority, application Belgium, Apr. 21, 1967, 697,364
8 Claims. (Cl. 118—503)

ABSTRACT OF THE DISCLOSURE

Device for processing articles of non-magnetic material available in sheet form comprising at least two supports provided with an element establishing a magnetic field, these two supports being made integral and movable with reference to a frame onto which is secured a table adapted to selectively cooperate with one of the supports. Means being provided arrest each of the supports in a position facing the table. In operation, the article of non-magnetic material is laid out on the table and covered with a component of magnetic material, the article and the component being, after processing, slid down from a support to a table.

---

The present invention has for its object a device for processing articles of non-magnetic material, available in sheet form such as leather, fabric, cardboard and the like . . . , wherein at least one article is held on a support, which is magnetized by at least one component of magnetic material.

The invention has for its object to provide a device to simply and to considerably increase the efficiency of the processing of articles of non-magnetic material, and more particularly the marking, and spray and stencil painting of shoe vamps.

For that purpose, according to the invention, the device comprises at least two supports provided with an element establishing a magnetic field, the supports being movable with reference to a frame onto which is secured a table adapted to selectively cooperate with each of the supports, means being provided to arrest each of the supports in a position facing the table. The article to be processed is laid on the table and is covered with a component of magnetic material and slid onto a support.

According to a form of embodiment of the invention, a guide means in the form of a sheet of non-magnetic material is disposed between the table and the article, this sheet being adapted to facilitate the transfer of the article and of the component of magnetic material from the table to the support, and vice versa.

According to an advantageous form of embodiment of the invention, the supports and the table are fitted in such a manner that when one support is located facing the table, the lateral faces of the table and of the support, parallel to the direction of movement of the article are located in the same plane.

According to a particularly advantageous form of embodiment of the invention, the guide means has at least one or more straight flanges integral with one of the edges of the sheet parallel to the said direction of movement, these flanges being adapted to be forced against and to slide, against the corresponding side faces of the table and the support during the transfer of the article and the component from the table to the support, or vice versa.

Other details and features of the invention will become apparent from the description of the drawings accompanying the present specification and which show, by way of non-limiting examples, several particular forms of embodiment of the object of the invention.

FIGURE 3 is a diagrammatic plane view of another embodiment of the device according to the invention.

FIGURE 4 is an elevational view corresponding to FIGURE 3.

In the different figures the same reference numerals refer to like elements.

Figure 1:
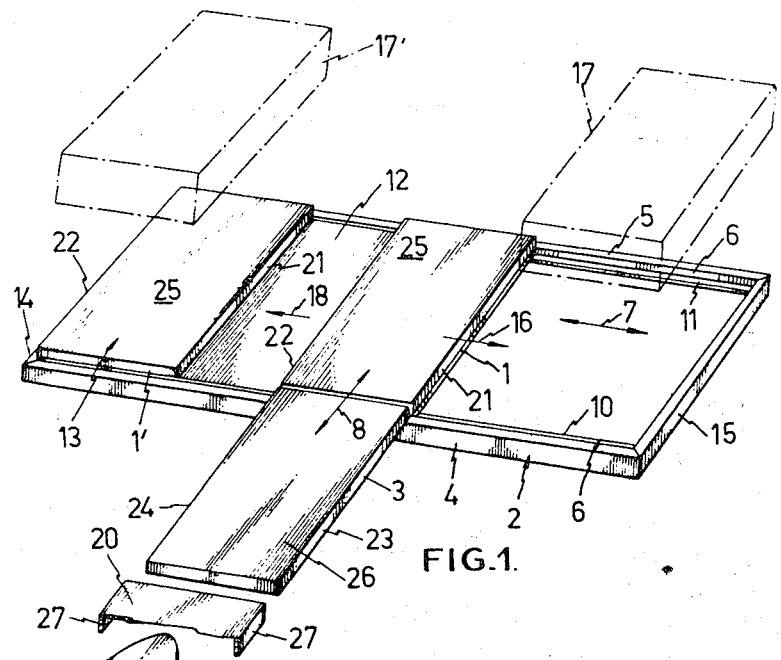
FIGURE 1 is a view in perspective, partially broken away, of the device according to the invention.

The device according to the invention, shown in FIGURE 1, comprises two supports 1 and 1' in which are embedded elements establishing a magnetic field. Each of these supports is adapted to receive and to arrest an article of non-magnetic material, such as a shoe vamp for marking, painting, or the like. The two supports 1 and 1' are movable with respect to a frame 2 in which they are mounted and to which is connected a table 3 adapted to selectively cooperate with support 1 or support 1' in order that a vamp 9 to be processed can be moved to and from the support. The frame 2 may be secured or laid down on a carrier (not shown) and is of square or rectangular shape.

The frame 2 is provided along two of its opposite edges 4 and 5, with guiding means 6, such as rails 10 and 11, for the supports 1 and 1', these rails being fitted so that the supports may move in a manner so that their upper faces shall remain substantially level, along a direction 7 substantially at right angles to the direction 8 of the movement of the vamp 9. The table 3 is secured to the rail 10 and a free space 12 is provided between the supports 1 and 1' in order to facilitate the movements of the vamp to be processed from the table to the supports or of the processed vamps from the supports to the table. The dimensions of the table 5 and of the assembly 13 of each support 1 and 1', measured parallel to the rails 10 and 11, are determined so that when the assembly 13 abuts against one of the cross members 14 or 15 of the frame 2, one of the supports can face table 3.

The different operations, in the case of painting vamps, proceed in the following manner: a vamp 9 is laid out on the table 3 and is covered with a stencil 19 of magnetic material, the assembly vamp and stencil being subsequently slid, in order to be arrested, on the support 1 which faces table 3. The vamp is then spray painted and the assembly 13 is slid in the direction indicated by arrow 16, so that the assembly shall abut against the transverse member 15 of the frame, the support 1' thus being brought to face table 3 in order to be provided, in turn, with a vamp previously positioned on the table. While this latter vamp is being painted, the vamp which is on the support 1 dries, for example with the help of a source of heat 17 shown in dash dot lines. When the vamp on the support 1 has been painted, the assembly 13 is slid in the frame in the direction indicated by arrow 18, and the support 1 is brought back to face table 3 in order that the painted and dried vamp arrested thereon may be removed and to take up a new vamp for painting. During the latter operations, the painted vamp located on the support 1' dries with the help of a source of heat 17' and so on.

In order to facilitate the operations of transferring the vamps from the table 3 to the supports and vice versa, a sheet 20 of non-magnetic material is provided between the table 3 and the vamp 9. The table 3 and the supports are dimensioned so that, when a support is located facing table 3, the lateral faces 21 and 22 of the support are located in the extension of the lateral faces 23 and 24 of the table, and the face 25 of the support and the face 26 of the table are adjacent and located within the same plane. The sheet 20 is provided with a pair of flanges 27 adapted to rest and to slide, during the transfer of the vamp, against the lateral faces 21, 22, 23 and 24 of the table 3 and of one of the supports 1 and 1', the sheet thus acting as a guide.

Figure 2:
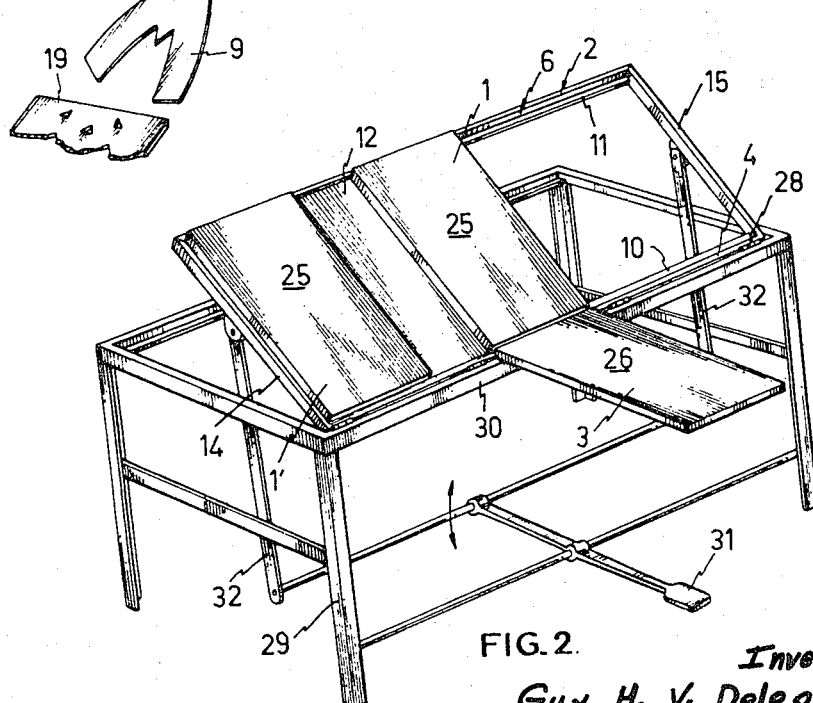
FIGURE 2 is a view in perspective showing an alternative of the device shown in FIGURE 1.

The device according to the invention shown in FIGURE 2 comprises a frame 2 in which is mounted, in the same manner as described hereinbefore, supports 1 and 1'. The frame 2 is hinged, by means of an articulated system 28 along its side 4 to a stationary frame 29, and the table 3 is secured to the cross member 30 of the frame 29. The operation is started with frame 2 in a horizontal position in which the operations of transferring the vamps from the table 3 to the supports 1, and 1' and vice versa, are carried out. The frame 2 may then be set at an angle, by means of a foot-treadle 31 and levers 32, so that the top face 25 of the supports shall establish an obtuse angle with the face 26 of the table 3. Therefore, for the transfer operations, the supports 1 and 1' and the table 3 take up the same positions as the supports and the table 3 of the embodiment shown in FIGURE 1, the supports being only set at an angle for the painting operations. It is to be understood that the device of FIG. 2 is also provided with sources of heat, not shown, so as to assure the drying of the vamps.

The device according to the invention shown in FIGURES 3 and 4 comprises supports 1 regularly secured on a disc 33 adapted to rotate around a vertical shaft 34. The disc 33 rests, by means of rollers 35, on a stationary frame 36 on which is mounted table 3, so that the rim 37 thereof shall be substantially adjacent to the rim 38 of the disc and the edge 45 of the supports 1. Means 39 are provided on the table to arrest each of the supports 1 in succession in a facing position with reference to table 3. The means 39 comprise a sphere 40 mounted on the table and being applied, by means of a spring 41, against the rim 38 of the disc. The sphere 40 cooperates with recesses 42 provided in the rim of the disc so that when the sphere enters one of these recesses to arrest the disc, a support 1 shall be in a facing position with reference to table 3. The sphere 40 is released from the recess which it has engaged, in order to free the disc, by applying a force to the latter in order to make it rotate around the shaft thereof. This latter device enables two operators to work simultaneously—one operator carrying out the preparation of the vamps and of the stencils, the transfer thereof from the table to the supports and vice versa, and the rotation of the disc; while the second operator paints the vamps. This device is also provided with one or more sources of heat (not shown) and with a hood 42' connected to an exhaust shaft 43 provided with a fan 44.

It must be understood that the invention is in no way limited to the forms of embodiment described and that many changes may be made to the latter without departing from the scope of the present patent application.

The devices according to the invention may be used to decorate, paint, glue, mark, trace, fleck, and the like, any article of leather, cardboard, paper, fabric, plastic material, and the like, in a non-magnetic material and available in sheet form, this article being maintained on one of the supports of the devices by a component, such as a pattern, template, stencil and the like, made from a magnetic material.

We claim:

1. A device for processing articles of non-magnetic material comprising a frame; at least two support members fixed relative to one another, said support members being carried by said frame and movable with respect thereto, each of said support members being adapted to carry an article for processing and to move to and from a predetermined position with respect to said frame; means to magnetize said support members; a table extending out from said frame adjacent said predetermined position, the upper surface of said table being coextensive with the upper surface of a support member when the latter is in said predetermined position, said guide means, said supports members and said table having mutually engaging means for providing guidance of said guide means during the guiding movement thereof; and a magnetic stencil member adapted to overlie said article to retain said article with respect to said support member when magnetized.

2. A device as claimed in claim 1, wherein the sides of a table are coextensive with the sides of a support member when the latter is in said predetermined position and the engaging means of said guide means is in the form of a pair of side flanges adapted to engage said sides of said table and said support member during said guiding movement of said guide means.

3. A device as claimed in claim 1, wherein said frame is stationary and of rectangular shape, said frame being provided along two of its opposite edges with guiding members for said support members, said guiding members being fitted so that the support members may move in order that their upper faces shall remain substantially level, along a direction substantially at right angles to the direction of the movement of the article to transfer the latter from the table to the support and vice versa, said table being secured to one of the guiding members, a free space being provided between the support members in order to ease the movements of the article to be processed from the table to the support members and vice versa, the dimensions of the table and of the assembly of the supports measured parallel to the guiding members being determined so that, when the assembly of the support members shall abut against either the frame or against stops provided thereon, a support member shall be facing said table.

4. A device as claimed in claim 1, wherein said frame is of rectangular shape, said frame being hinged by means of an articulated system along one of its sides on a stationary support, said table being secured to the cross member of said stationary support, means to quick releasably position said frame on said stationary support at an angle so that the top faces of the support members shall establish an obtuse angle with the top face of the table in order to ease processing of the articles, the frame being provided along its edges parallel to said cross member with guide rails for said support members, a free space being provided between the support members in order to ease the movements of the article to be processed from the table to the support members and vice versa, the dimensions of the table and of the assembly of the support members measured parallel to the rails being determined so that when the assembly of the support members shall abut against either the frame or against stops provided thereon, a support member shall be facing said table.

5. A device as claimed in claim 1, further comprising a disc rotatably mounted on said frame around a vertical shaft, said support members being mounted on said disc, said table being mounted with respect to said frame so that one of its rims shall be substantially adjacent to the rim of the disc; and means to retain each of the support members in succession in said predetermined position.

6. A device as claimed in claim 5, wherein said retaining means comprises a sphere mounted on said table and resting by means of a spring against the rim of said disc, said sphere cooperating with recesses provided in the rim of the disc, said sphere being releasable from the recess in order to free the disc by applying a force to the latter in order to make it rotate around the shaft thereof.

7. A device as claimed in claim 5, further comprising a hood and an exhaust fan carried by said disc.

8. A device as claimed in claim 1, further comprising a source of heat disposed above said frame for heating said articles.

References Cited

UNITED STATES PATENTS

| | | | |
|---|---|---|---|
| Re. 20,429 | 6/1937 | Koca | 269—8 X |
| 622,513 | 4/1899 | Murnane | 118—500 |
| 1,624,538 | 4/1927 | Crain | 269—8 X |
| 2,034,003 | 3/1936 | Shurley | 101—115 |
| 2,100,920 | 11/1937 | Rogers | 118—52 X |
| 2,126,110 | 8/1938 | Hart | 90—84 |
| 2,396,885 | 3/1946 | Roloson | 118—500 X |
| 2,776,596 | 1/1957 | Eigen. | |
| 3,170,810 | 2/1965 | Kagon | 118—504 X |
| 3,228,794 | 1/1966 | Ames | 118—504 X |
| 1,553,529 | 9/1925 | Hayden | 269—8 X |

CHARLES A. WILLMUTH, *Primary Examiner.*

MORRIS KAPLAN, *Assistant Examiner.*